United States Patent
Anthony et al.

(10) Patent No.: US 6,243,528 B1
(45) Date of Patent: Jun. 5, 2001

(54) FIBER LOCKING SYSTEM

(75) Inventors: Philip J. Anthony, Bridgewater; William B. Joyce, Basking Ridge, both of NJ (US); Ralph S. Moyer, Mohnton, PA (US)

(73) Assignee: Agere Systems Optoelectronics Guardian Corp., Allentown, PA (US)

( * ) Notice: Subject to any disclaimer, the term of this patent is extended or adjusted under 35 U.S.C. 154(b) by 0 days.

(21) Appl. No.: 09/161,081

(22) Filed: Sep. 25, 1998

(51) Int. Cl.$^7$ ....................................................... G02B 6/44
(52) U.S. Cl. ............................. 385/137; 385/39; 385/136
(58) Field of Search ................................. 385/14, 15, 39, 385/49–51, 88–94, 134–137, 147; 372/33, 34

(56) References Cited

U.S. PATENT DOCUMENTS

| | | | |
|---|---|---|---|
| 4,645,294 | * | 2/1987 | Oguey et al ...................... 385/137 X |
| 4,803,361 | * | 2/1989 | Aiki et al. ........................... 385/51 X |
| 4,832,442 | * | 5/1989 | Pappas ................................. 385/102 |
| 5,185,835 | * | 2/1993 | Vial et al. ............................. 385/49 |
| 5,692,086 | * | 11/1997 | Beranek et al. ........................ 385/94 |
| 5,789,701 | * | 8/1998 | Wettengel et al. ................ 385/113 X |
| 5,914,972 | * | 6/1999 | Siala et al. ............................. 372/33 |
| 6,016,377 | * | 1/2000 | Suhir .................................... 385/135 |

OTHER PUBLICATIONS

"Spring Constant in the Buckling of Dual–Coated Optical Fibers;" E. Suhir; from *Journal of Lightwave Technology*; vol. 6, No. 7; 1240–1244; Jul. 1988.

"Effect of Initial Curvature on Low Temperature Microbending in Optical Fibers;" E. Suhir; from *Journal of Lightwave Technology*; col. 6, No. 8; 1321–1327; Aug. 1988.

"Input/Output Fiber Configuration in a Laser Package Design;" E. Suhir, C. Paola, and W.M. MacDonald; from *Journal of Lightwave Technology*, vol. 11, No. 12; 2087–2092; Dec. 1993.

* cited by examiner

Primary Examiner—John D. Lee
(74) Attorney, Agent, or Firm—Synnestvedt & Lechner

(57) ABSTRACT

A system is provided for mounting a fiber between locks by placing the locks at or near the natural inflection points of a sinusoidally curved fiber. This is accomplished by angularly offsetting the fiber exiting the locks at equal angles from an imaginary center line drawn between the locks, and by providing enough slack in the fiber between the locks to cause the inflection points to be positioned at or near the locks.

22 Claims, 2 Drawing Sheets

FIBER LOCKING SYSTEM

FIELD OF THE INVENTION

This invention relates to the mounting of optical fibers, and more particularly to a method for minimizing the stresses on an optical fiber which is mounted between fixed points.

BACKGROUND OF THE INVENTION

In fiber optic apparatus it may be necessary to anchor one end of an optical fiber in a fixed position. For example, the end of an optical fiber would have to be set in a fixed position at the output of a laser or other light projecting or light sensing apparatus. To anchor a fiber in a fixed position, it is generally necessary to lock the fiber at two spaced points, as depicted schematically in FIG. 1. In this depiction, laser module 10 comprises a laser 12 which projects light through fiber 14. Fiber 14 passes through lock units 16 and 18, which are anchored to case 11 of laser module 10. These locks hold the fiber in place at locking points 17 and 19, respectively. In general, the purpose of the first lock 16 is to hold fiber 14 in alignment with laser 12, while the second lock 18 is provided so that any stress on the loose "pigtail" portion 20 of the fiber will not be transmitted to lock 16, or so that the entire laser unit 10 can be hermetically sealed. Locking is achieved at the lock points by securing the fiber, such as by clamping, soldering or gluing, as is well known in the art. In the usual configuration, the locks are collinear and the fiber is locked from all movement.

When the fiber is locked in place, stress is almost invariably imposed on the fiber either initially during the manufacturing process or subsequently during use because of thermal expansion mismatch between the fiber and the laser module support structure over the range of operating temperatures. During manufacture and subsequent use, the fiber and laser module are subject to a range of operating temperatures caused by such factors as changes in ambient temperature, manufacturing processes such as soldering, and heat generated by operation of the laser during use. Such changes in temperature cause the fiber to expand and contract in accordance with its coefficient of thermal expansion, while causing the locks to move together or apart in accordance with the thermal expansion coefficient of the components of the laser module to which the locks are attached. The difference in the expansion coefficients causes the fiber and locks to expand and contract with respect to each other, thus causing stress on the fiber.

For example, in the simplified depiction of FIG. 1 fiber 14 is mounted in a straight line between locking points 17 and 19, which are separated by a distance L. Initially both the length of the fiber and the distance between the locks is L. As the temperature changes, stress on the fiber can be quantified by saying that the distance L+dL between the locks differs from the length L that the fiber would assume were the fiber free at the same temperature. If dL is greater than zero, then the fiber is in tension and subject to immediate or eventual fracture. If dL is less than zero, and the fiber is free to flex between the locks, then the fiber tends to assume a sinusoidal shape, as depicted in FIG. 2.

In FIG. 2, the maximum points of stress M are at the locking points 17 and 19, as well as at the center of the sine wave. The minimum stress is at intermediate inflection points I. The bending of the fiber at the locks can damage the fiber and eventually cause it to break. As an analogy, to break a stick, one could extend part of the stick past a table edge (the lock) and bend down on the cantilever so as to concentrate the stress at the table edge, causing the stick to bend and eventually break. Likewise, bending of the optical fiber at the rigid lock point can damage or break the fiber. Further, inhomogeneities in the solder or glue can enhance the stress concentration at the lock.

Such bending stresses are well known, and various techniques have been used to reduce these stresses. One technique to reduce stress is to use materials for case 11 which match the expansion coefficient to that of the glass optical fiber. However, such materials may be quite expensive and often have poor physical properties over the range of operating temperatures and conditions, and, furthermore, the expansion match is usually imperfect.

Another technique used is to provide a slack in the fiber to allow for expansion and contraction. When the locks are aligned as in FIG. 2, the slack would assume the same sinusoidal shape as results from fiber expansion. As discussed above, this results in maximum bending stress at points M, which is particularly damaging at the lock points. In an attempt to alleviate this stress, FIG. 3 depicts a technique in which the second lock 18 is set at an angle to reduce the stress on fiber 14 at lockpoint 19. However, as the fiber assumes its natural sinusoidal bend, it was found that such a configuration still causes undesirable bending stress on the fiber at lockpoints 17 and 19.

Accordingly, there is a need for a method of mounting a fiber between lockpoints to minimize the stresses to which the fiber is exposed during operational temperature cycling.

SUMMARY OF THE INVENTION

In accordance with the present invention, a system is provided for mounting a fiber between locks by placing the locks at or near the natural inflection points of a sinusoidally curved fiber. This is accomplished by angularly offsetting the fiber exiting the locks at equal angles from an imaginary center line drawn between the locks, and by providing enough slack in the fiber between the locks to cause the inflection points to be positioned at or near the locks.

The fiber optic assembly of the present invention comprises an optical fiber extending between first and second locks for holding the fiber in a fixed position, wherein the fiber extending between the locks exits each lock at approximately the same angle G from a straight line of length L defined by the two points at which the fiber exits the locks, wherein the length of the fiber is greater than L. The fiber can exit the locks on the same side of the straight line, in which case it preferably lies in a single curve in which the optimum value b of the greatest distance of the curve from the straight line is defined by the equation $b=(L/\pi) * \tan G$, and wherein enough fiber is provided between said locks such that said greatest distance at a predetermined temperature is within about 20% of b. Alternatively, the fiber can exit the locks on opposite sides of the straight line, in which case it preferably lies in a double curve in which the optimum value b' of the greatest distance of the curve from the straight line is defined by the equation $b'=(L/2\pi) * \tan G$, and wherein enough fiber is provided between said locks such that said greatest distance at a predetermined temperature is within about 20% of b'.

DETAILED DESCRIPTION OF THE INVENTION

Figure 1:
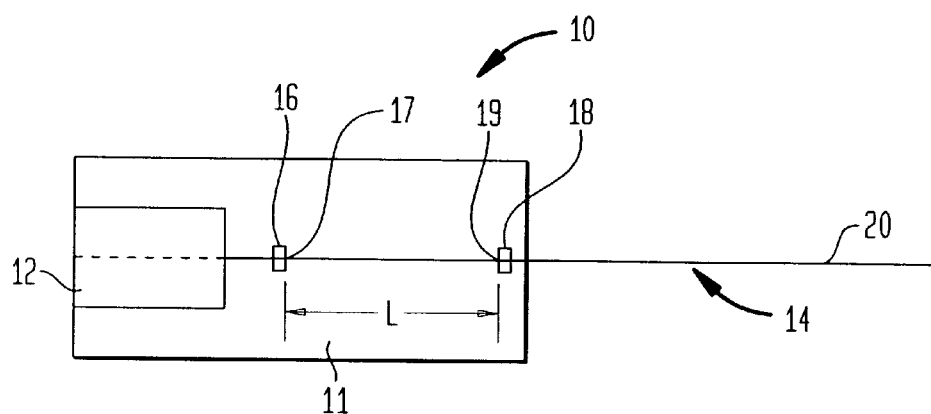
FIG. 1 is a schematic representation of a laser module with an optical fiber mounted without slack between two collinear locks.
Figure 2:
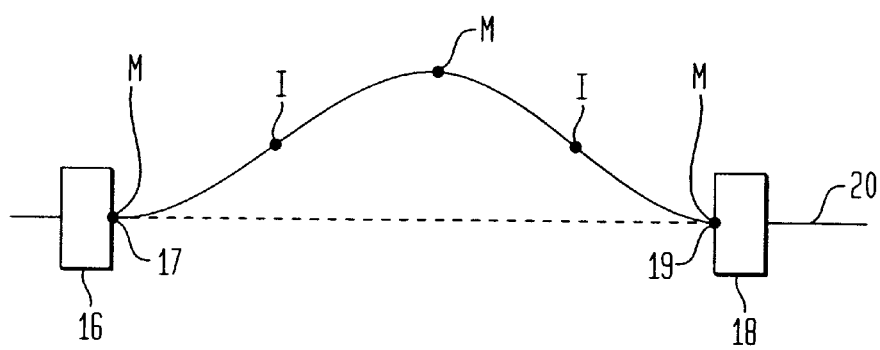
FIG. 2 is a schematic representation of the mounted fiber of FIG. 1 under stress caused by thermal-expansion mismatch.
Figure 3:
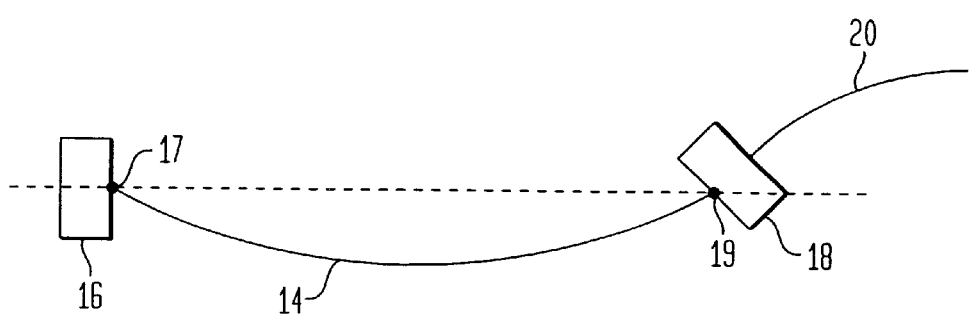
FIG. 3 is a schematic representation of a prior art method of mounting an optical fiber.
Figure 4:
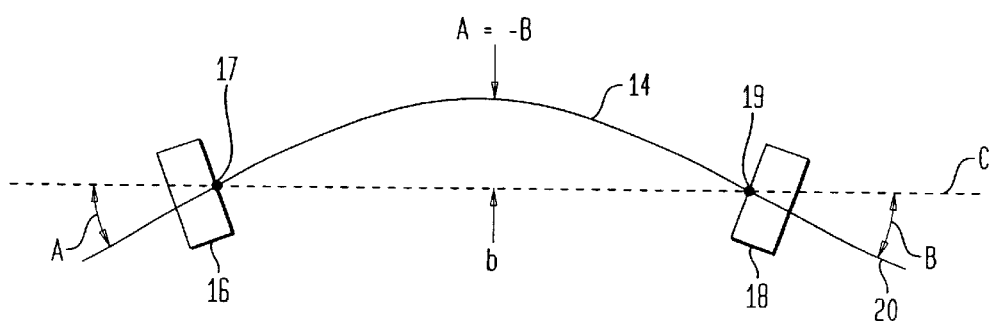
FIG. 4 is a schematic representation of the optical fiber of FIG. 1 mounted in accordance with an embodiment of the present invention.
Figure 5:
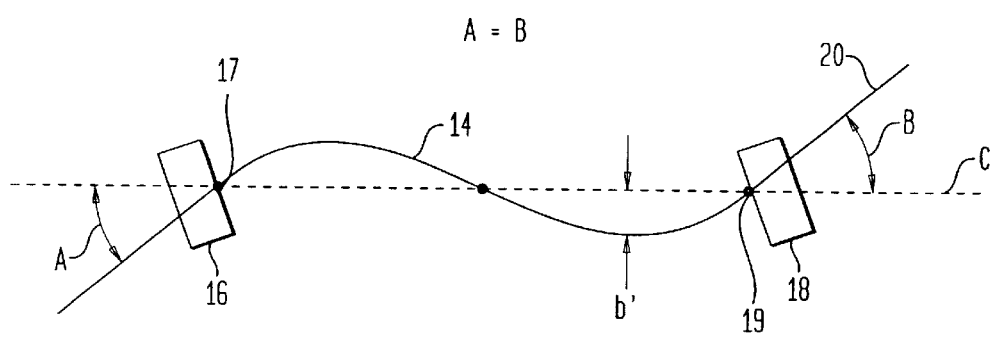
FIG. 5 is a schematic representation of the optical fiber of FIG. 1 mounted in accordance with another embodiment of the present invention.

Two systems for mounting an optical fiber in accordance with the present invention are depicted in FIGS. 4 and 5. In FIG. 4, fiber 14 is mounted by locks 16 and 18 which are both offset to the same side of the imaginary centerline C running between lockpoints 17 and 19. As depicted, lock 16 is offset at an angle A, while lock B is offset at an angle B. In this configuration, A=−B. In FIG. 5, fiber 14 is mounted by locks 16 and 18 which are offset to opposite sides of centerline C. In this configuration, A=B. The key point for both of these configurations is that the absolute values of the offset angles are about equal, that is, |A|=|B|.

Although the absolute value of angle A is ideally equal to that of angle B, it may be impractical to match these angles exactly. Therefore, it is considered within the scope of this invention if the absolute value of angle A is within about 20% of the absolute value of angle B, preferably within about 10%, and more preferably within about 5%.

To provide the advantages of the present invention, the locks should be angularly offset so that the fiber exits each lock at the point of inflection for the sinusoidal curve provided by the slack in the fiber. It is desirable to make angle A only as large as necessary to offset the anticipated thermal stress. For good results, the absolute value of angle A should be a minimum of about 0.1 degree, preferably at least about 1 degree. Preferably, the absolute value of A should be less than about 20 degrees, and more preferably less than about 10 degrees.

In FIG. 4, the center of the sinusoidal curve of fiber 14 is the point at which the fiber is the greatest distance from centerline C. If the value of angle A is G, and the length of centerline C between the locking points is L, then the optimum value b of the greatest distance from centerline C is defined by the equation:

$$b=(L/\pi) * \tan G$$

In FIG. 5, the center of each curve of the sinusoidal shape of fiber 14 is the point at which the fiber is the greatest distance from centerline C. If the value of angle A is G, and the length of centerline C between the locking points is L, then the optimum value b' of the greatest distance from centerline C is defined by the equation:

$$b'=(L/2\pi) * \tan G$$

In accordance with the present invention, enough fiber should be provided between the locking points so that the actual greatest distance of the fiber from the centerline is as close as possible to the optimum value b or b' in accordance with the above formulae, measured with the fiber at a predetermined temperature. Preferably, the predetermined temperature is selected to be at about the midpoint of the expected operating temperature range. This allows the fiber to expand and contract relative to the locks with minimal stress over the operating range. Also, preferably, the actual greatest distance is within about 20% of b or b', more preferably within about 10%, and most preferably within about 5% of b or b', respectively.

If the desired predetermined temperature is different from the temperature of the fiber at installation, the calculation of the amount of fiber to use would be based on the coefficient of thermal expansion of the fiber, and can readily be calculated by one skilled in the art.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A fiber optic assembly comprising an optical fiber extending between first and second locks for holding the fiber in a fixed position, wherein the locks are oriented such that the fiber extending between the locks exits each lock at approximately the same angle G from a straight line of length L defined by the two points at which the fiber exits the locks, wherein the length of the fiber is greater than L.

2. The assembly of claim 1 wherein the fiber exits the locks on the same side of said straight line, and lies in a single curve in which the optimum value b of the greatest distance of the curve from the straight line is defined by the equation b=(L/π) * tan G, and wherein enough fiber is provided between said locks such that said greatest distance at a predetermined temperature is within about 20% of b.

3. The assembly of claim 2 wherein said predetermined temperature is approximately equal to the midpoint of the intended temperature operating range of said fiber.

4. The assembly of claim 1 wherein the fiber exits the locks on opposite sides of said straight line, and lies in a double curve in which the optimum value b' of the greatest distance of the curve from the straight line is defined by the equation b'=(L/290) * tan G, and wherein enough fiber is provided between said locks such that said greatest distance at a predetermined temperature is within about 20% of b'.

5. The assembly of claim 4 wherein said predetermined temperature is approximately equal to the midpoint of the intended temperature operating range of said fiber.

6. The assembly of claim 1 wherein the absolute values of said angles are within 20% of each other.

7. The assembly of claim 6 wherein the absolute values of said angles are within 5% of each other.

8. The assembly of claim 1 wherein the absolute values of said angles are from about 0.1 degree and to about 20 degrees.

9. The assembly of claim 8 wherein the absolute values of said angles are from about 1 degree and to about 10 degrees.

10. A method of mounting an optical fiber comprising:
 a) providing two locks for said fiber mounted at a preselected distance L from each other;
 b) orienting the locks such that the fiber extending between the locks exits each lock at approximately the same angle G from a straight line defined by the two points at which the fiber exits the locks; and
 c) providing a length of fiber between the locks which is greater than L.

11. The method of claim 10 wherein the fiber is mounted to exit the locks on the same side of said straight line, and lies in a single curve in which the optimum value b of the greatest distance of the curve from the straight line is defined by the equation b=(L/π) * tan G, and wherein enough fiber is provided between said locks such that said greatest distance at a predetermined temperature is within about 20% of b.

12. The method of claim 11 wherein said predetermined temperature is approximately equal to the midpoint of the intended temperature operating range of said fiber.

13. The method of claim 10 wherein the fiber is mounted to exit the locks on opposite sides of said straight line, and lies in a double curve in which the optimum value b' of the greatest distance of the curve from the straight line is defined by the equation b'=(L/2π) * tan G, and wherein enough fiber is provided between said locks such that said greatest distance at a predetermined temperature is within about 20% of b'.

14. The method of claim 13 wherein said predetermined temperature is approximately equal to the midpoint of the intended temperature operating range of said fiber.

15. A fiber optic assembly comprising an optical fiber extending between first and second locks for holding the fiber in a fixed position, wherein the fiber extending between the locks exits each lock at approximately the same angle G from a straight line of length L defined by the two points at which the fiber exits the locks, wherein the length of the fiber is greater than L, and wherein either
(i) the fiber exits the locks on the same side of said straight line, and lies in a single curve in which the optimum value b of the greatest distance of the curve from the straight line is defined by the equation b=(L/π) * tan G, and wherein enough fiber is provided between said locks such that said greatest distance at a predetermined temperature is within about 20% of b; or
(ii) the fiber exits the locks on opposite sides of said straight line, and lies in a double curve in which the optimum value b' of the greatest distance of the curve from the straight line is defined by the equation. b'=(L/2π) * tan G, and wherein enough fiber is provided between said locks such that said greatest distance at a predetermined temperature is within about 20% of b'.

16. The assembly of claim 15 wherein said predetermined temperature is approximately equal to the midpoint of the intended temperature operating range of said fiber.

17. The assembly of claim 15 wherein the absolute values of said angles are within 20% of each other.

18. The assembly of claim 17 wherein the absolute values of said angles are within 5% of each other.

19. The assembly of claim 15 wherein the absolute values of said angles are from about 0.1 degree and to about 20 degrees.

20. The assembly of claim 19 wherein the absolute values of said angles are from about 1 degree and to about 10 degrees.

21. A method of mounting an optical fiber comprising:
a) providing two locks for said fiber mounted at a preselected distance L from each other;
b) mounting the fiber in the locks such that the fiber extending between the locks exits each lock at approximately the same angle G from a straight line defined by the two points at which the fiber exits the locks; and
c) providing a length of fiber between the locks which is greater than L,
and wherein either
(i) the fiber is mounted to exit the locks on the same side of said straight line, and lies in a single curve in which the optimum value b of the greatest distance of the curve from the straight line is defined by the equation b=(L/π) * tan G, and wherein enough fiber is provided between said locks such that said greatest distance at a predetermined temperature is within about 20% of b; or
(ii) the fiber is mounted to exit the locks on opposite sides of said straight line, and lies in a double curve in which the optimum value b' of the greatest distance of the curve from the straight line is defined by the equation b'=(L/2π) * tan G, and wherein enough fiber is provided between said locks such that said greatest distance at a predetermined temperature is within about 20% of b'.

22. The method of claim 21 wherein said predetermined temperature is approximately equal to the midpoint of the intended temperature operating range of said fiber.

* * * * *